United States Patent
Furuya

(10) Patent No.: US 12,403,734 B2
(45) Date of Patent: Sep. 2, 2025

(54) VEHICLE REAR STRUCTURE AND TRAILER COUPLING STRUCTURE OF VEHICLE

(71) Applicant: SUBARU CORPORATION, Tokyo (JP)

(72) Inventor: Akira Furuya, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 441 days.

(21) Appl. No.: 17/886,819

(22) Filed: Aug. 12, 2022

(65) Prior Publication Data

US 2023/0086462 A1 Mar. 23, 2023

(30) Foreign Application Priority Data

Sep. 17, 2021 (JP) ................. 2021-151856

(51) Int. Cl.
*B60D 1/48* (2006.01)

(52) U.S. Cl.
CPC .................... *B60D 1/485* (2013.01)

(58) Field of Classification Search
CPC ..................................................... B60D 1/485
See application file for complete search history.

(56) References Cited

U.S. PATENT DOCUMENTS

| | | | | |
|---|---|---|---|---|
| 9,180,745 B1 * | 11/2015 | Courtright | ......... | B62D 25/2054 |
| 9,415,648 B2 * | 8/2016 | McCall | .................. | B60D 1/485 |
| 9,505,280 B2 * | 11/2016 | Furukawa | .............. | B60D 1/485 |
| 2012/0056448 A1 * | 3/2012 | Takahashi | ................ | B60D 1/06 |
| | | | | 296/203.04 |
| 2012/0145467 A1 | 6/2012 | Wakatsuki et al. | | |
| 2017/0015163 A1 * | 1/2017 | Sielhorst | .................. | B60D 1/54 |
| 2023/0226865 A1 * | 7/2023 | Jing | ....................... | B60D 1/485 |
| | | | | 280/501 |

FOREIGN PATENT DOCUMENTS

| | | | | |
|---|---|---|---|---|
| DE | 102018216816 B4 * | 2/2021 | ............. | B60D 1/06 |
| DE | 102021109091 A1 * | 10/2021 | ............. | B60D 1/06 |
| JP | 2000-203467 A | 7/2000 | | |
| JP | 2009190559 A * | 8/2009 | ............. | B60D 1/06 |
| JP | 2012-126168 A | 7/2012 | | |
| JP | 2015-189447 A | 11/2015 | | |
| JP | 2018103877 A * | 7/2018 | | |
| JP | 2020-116989 A | 8/2020 | | |
| JP | 2020175783 A * | 10/2020 | | |

OTHER PUBLICATIONS

Japanese Office Action, dated May 23, 2025 in Japanese Application No. 2021-151856 and English Translation Thereof.

* cited by examiner

*Primary Examiner* — Kevin Hurley
(74) *Attorney, Agent, or Firm* — MCGINN I.P. LAW GROUP, PLLC

(57) ABSTRACT

A vehicle rear structure includes an interposed member and an attachment part. The interposed member is disposed at a center area in a vehicle width direction of the vehicle under a floor panel of a vehicle body of the vehicle, and interposed between at least one under-floor component of the vehicle and the vehicle body. The attachment part is provided for a hitch member for a trailer. The attachment part is disposed at a rear end of the interposed member and at a center area of the interposed member in the vehicle width direction.

20 Claims, 3 Drawing Sheets

VEHICLE REAR STRUCTURE AND TRAILER COUPLING STRUCTURE OF VEHICLE

CROSS-REFERENCE TO RELATED APPLICATIONS

The present application claims priority from Japanese Patent Application No. 2021-151856 filed on Sep. 17, 2021, the entire contents of which are hereby incorporated by reference.

BACKGROUND

The disclosure relates to a vehicle rear structure having an attachment part for a hitch member for a trailer, and a trailer coupling structure of a vehicle provided with the vehicle rear structure.

There is a known trailer coupling structure of a vehicle in which a fixing bar as a hitch member extending in a vehicle width direction is fixed to a coupling bar permanently affixed to a vehicle body frame at a rear end of the vehicle and extending in the vehicle width direction, and a front end portion of a base of a trailer is pivotally coupled to a hook disposed on the fixing bar (for example, see Japanese Unexamined Patent Application Publication (JP-A) No. 2000-203467). There is also a known trailer coupling structure in which a hitch member extending in a vehicle width direction is fixed to a side frame extending in a front-rear direction at a rear end of a vehicle.

SUMMARY

An aspect of the disclosure provides a rear structure of a vehicle. The rear structure includes an interposed member and an attachment part. The interposed member is disposed at a center area in a vehicle width direction of the vehicle under a floor panel of a vehicle body of the vehicle, and interposed between at least one under-floor component of the vehicle and the vehicle body. The attachment part is provided for a hitch member for a trailer. The attachment part is disposed at a rear end of the interposed member at a center area of the interposed member in the vehicle width direction.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to describe the principles of the disclosure.

DETAILED DESCRIPTION

In the trailer coupling structure of the vehicle described in JP-A No. 2000-203467, it is necessary to secure an attachment space for a hitch member on a rear end side of a vehicle body. Thus, it is difficult to attach a hitch member to a vehicle having a small amount of rearward overhang from a rear axle. There is also a problem in that when the hitch member is attached to the rear end side of the vehicle body, deformation, cracking, and the like are likely to occur in the vehicle body.

It is desirable to provide a vehicle rear structure in which a hitch member can be simply and easily attached even in a vehicle having a small amount of overhang from a rear axle, and deformation, cracking, and the like are less likely to occur in a vehicle body, and a trailer coupling structure of a vehicle provided with the vehicle rear structure.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
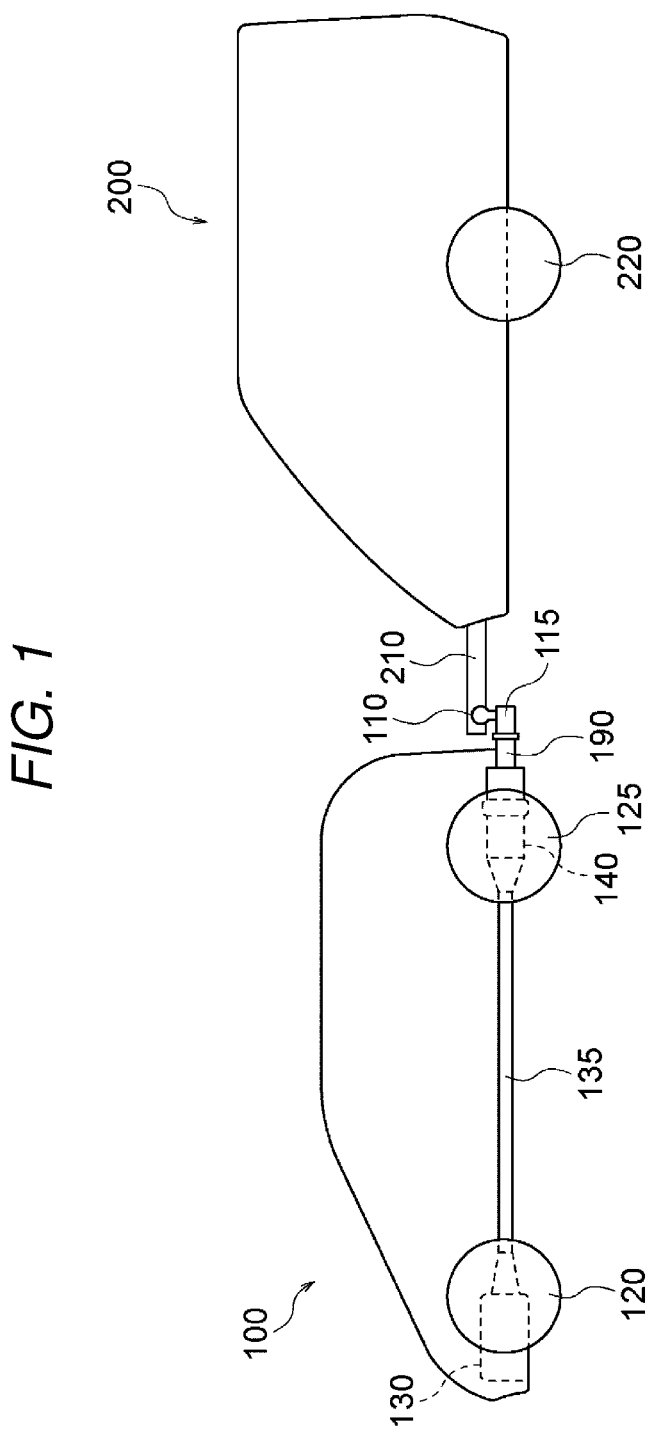
FIG. 1 is a schematic diagram illustrating a vehicle and a trailer according to an embodiment of the disclosure.
Figure 2:
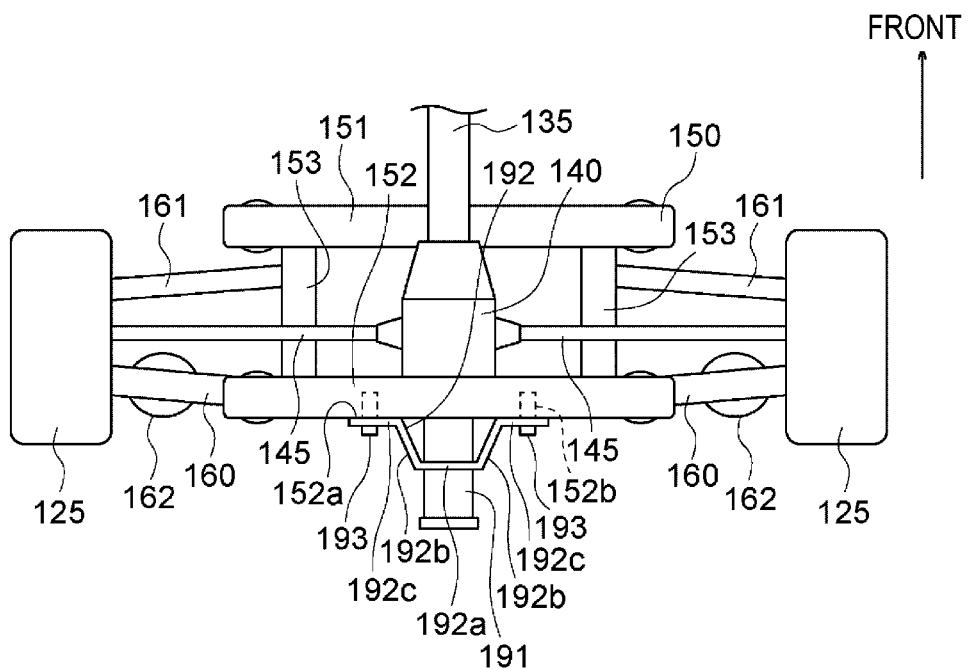
FIG. 2 is a bottom view illustrating a vehicle rear structure when a hitch member is attached.
Figure 3:
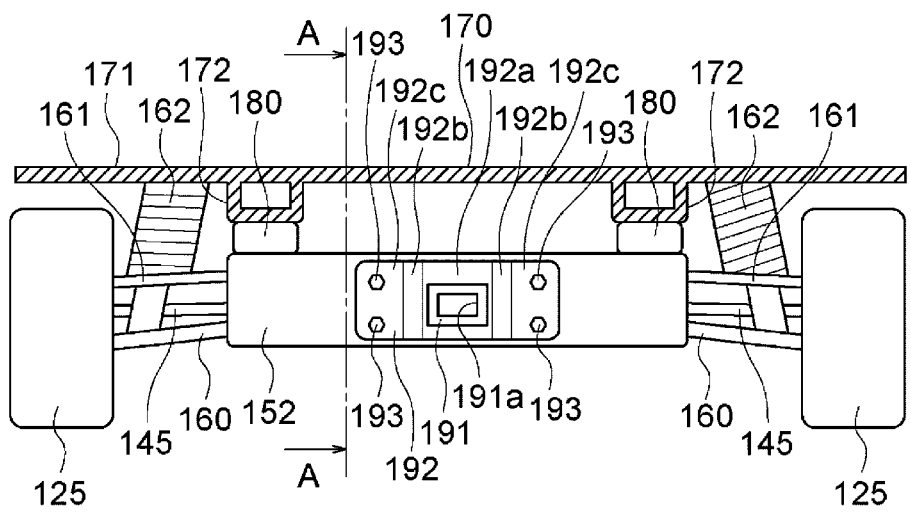
FIG. 3 is a back cross-sectional view illustrating the vehicle rear structure when the hitch member is attached.
Figure 4:
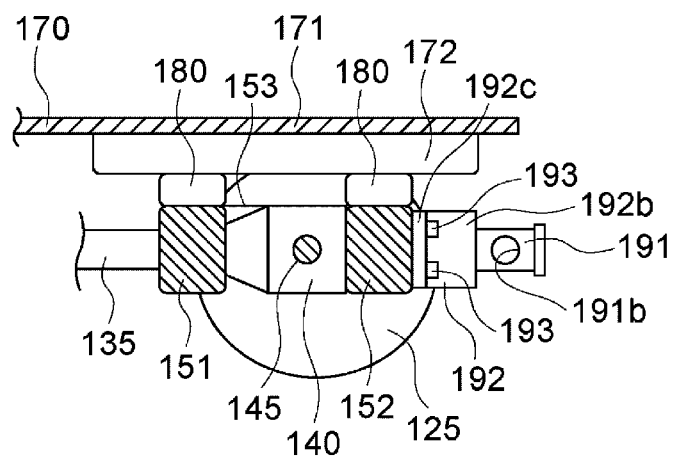
FIG. 4 is a cross-sectional view taken along a line A-A of FIG. 3.
Figure 5:
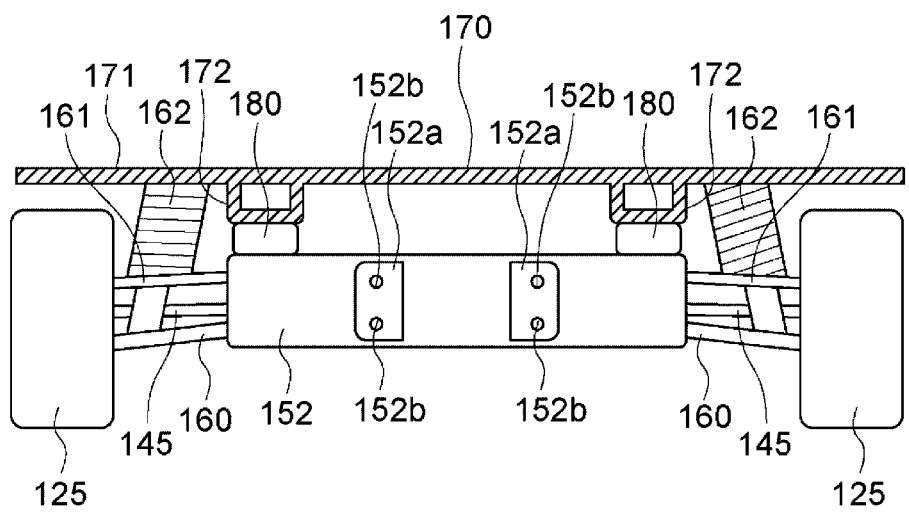
FIG. 5 is a back cross-sectional view illustrating the vehicle rear structure before the hitch member is attached.

FIG. 1 is a schematic diagram illustrating a vehicle and a trailer according to the embodiment of the disclosure; FIG. 2 is a bottom view illustrating a vehicle rear structure when a hitch member is attached; FIG. 3 is a back cross-sectional view illustrating the vehicle rear structure when the hitch member is attached; FIG. 4 is a cross-sectional view taken along a line A-A of FIG. 3; and FIG. 5 is a back cross-sectional view illustrating the vehicle rear structure before the hitch member is attached.

As illustrated in FIG. 1, a vehicle 100 tows a trailer 200 coupled to a rear portion of the vehicle 100. The vehicle 100 and the trailer 200 are coupled by a hitch ball 110 and a coupler 210. The hitch ball 110 is disposed at an upper portion of a ball mount 115, on a rear end side, extending in a front-rear direction. The coupler 210 is disposed at a front end of the trailer 200 to protrude forward, and receives the hitch ball 110 from an upper side at a front end. A coupling portion between the hitch ball 110 and the coupler 210 is the same as a coupling portion in the related art, and thus will not be described in detail here.

The vehicle 100 has two axles, and a pair of left and right front wheels 120 and a pair of left and right rear wheels 125, that is, a total of four wheels are grounded. On the other hand, the trailer 200 has one axle, and a pair of left and right wheels 220 are grounded. In the present embodiment, a power unit 130 is disposed on a front side of the vehicle 100, and power is transmitted to the front wheels 120 while power is also transmitted to the rear wheels 125 via a drive shaft 135. A rear differential 140 that allows a difference in rotation between the rear wheels 125 is disposed at a rear end of the drive shaft 135. As illustrated in FIG. 2, an axle 145 that transmits the power to the rear wheels 125 is coupled to the rear differential 140.

As illustrated in FIG. 2, the rear differential 140 is supported by a suspension frame 150. Lower arms 160 and upper arms 161 of a rear suspension are attached to the suspension frame 150. In the present embodiment, the suspension frame 150 forms an interposed member disposed at a center area in a vehicle width direction under a floor panel 171 of a vehicle body 170 and interposed between at least one under-floor component and the vehicle body 170. In the present embodiment, the under-floor components are a housing of the rear differential 140, and the lower arms 160 and the upper arms 161 of the rear suspension.

In the present embodiment, the suspension frame 150 includes a first cross member 151 extending in a left-right direction, a second cross member 152 extending in the left-right direction behind the first cross member 151, and a pair of left and right side members 153 having front and rear ends coupled to the first cross member 151 and the second cross member 152 and extending in the front-rear direction. In the present embodiment, a rear end of the housing of the rear differential 140 is supported by the second cross member 152.

As illustrated in FIG. 3, the first cross member 151 and the second cross member 152 are fixed to the vehicle body 170 of the vehicle 100 via rubber mounts 180. The vehicle body 170 includes the floor panel 171 and a pair of left and right side frames 172 disposed on a lower surface of the floor panel 171. The floor panel 171 and the side frames 172 form a closed cross section. In the present embodiment, the first cross member 151 and the second cross member 152 are fixed to the side frames 172 via the rubber mounts 180.

The lower arms 160 of the rear suspension are rotatably attached to knuckles (not illustrated) of the rear wheels and the second cross member 152. The upper arms 161 of the rear suspension are rotatably attached to the knuckles of the rear wheels and the side members 153. The rear suspension includes struts 162 that are each interposed between the floor panel 171 and the lower arm 160 and each include a spring and a shock absorber.

As illustrated in FIG. 2, a hitch member 190 can be attached to a back surface of the second cross member 152. The hitch member 190 includes a member main body 191 that horizontally extends in the front-rear direction, and a bracket part 192 that fixes the member main body 191 to the second cross member 152. The member main body 191 is formed in a rectangular tube shape, and receives a front end of the ball mount 115 from an opening 191a at a rear end. In the present embodiment, as illustrated in FIG. 4, a pin hole 191b is formed in each side surface of the member main body 191. The ball mount 115 and the member main body 191 can be fixed by inserting a pin (not illustrated) into the ball mount 115 and the member main body 191, when the ball mount 115 is inserted into the member main body 191.

As illustrated in FIG. 2, the bracket part 192 is formed in a substantially hat-shaped plate shape in a bottom view, and includes a holding portion 192a that holds the member main body 191 at a predetermined position in the front-rear direction, a pair of left and right extending portions 192b that extend forward from left and right ends of the holding portion 192a while being inclined to left and right outer sides, and fixing portions 192c that respectively extend from front ends of the extending portions 192b to the left and right outer sides along the back surface of the second cross member 152. The fixing portions 192c of the bracket part 192 are fixed to the second cross member 152 by bolts 193.

In the present embodiment, as illustrated in FIG. 5, a hitch member attachment part of the second cross member 152 includes a seat surface 152a of the fixing portions 192c of the bracket part 192 that is formed on the back surface of the second cross member 152, and female screw portions 152b that are formed on the seat surface 152a and screwed with the bolts 193. That is, the seat surface 152a and the female screw portions 152b form an attachment part for the hitch member 190 for the trailer 200 that is disposed at a rear end of the suspension frame 150 at the center area in the vehicle width direction.

According to the vehicle rear structure configured as described above, the hitch member 190 for the trailer 200 is attached to the attachment part at the rear end of the suspension frame 150 disposed under the floor panel 171. The member main body 191 of the hitch member 190 extends in the front-rear direction under the floor panel 171 when the hitch member 190 is attached to the suspension frame 150, and the coupler 210 of the trailer 200 is coupled to the hitch ball 110 of the ball mount 115 coupled to a rear end side of the hitch member 190. Accordingly, the hitch member 190 can be attached to the vehicle body at a position lower than that in the related art in which a hitch member is attached to a vehicle body. Thus, the center of gravity of the vehicle 100 can be lowered when the trailer 200 is coupled, so that the motion performance of the vehicle 100 can be improved, and rollover of the trailer 200 can be prevented.

Further, when a load is input from a trailer 200 side to a vehicle 100 side, the load is transmitted from the hitch member 190 to the vehicle body 170 via the suspension frame 150, and thus it is possible to reduce vibration and noise in a vehicle cabin as compared with the vehicle in the related art in which a load is directly transmitted from the hitch member to the vehicle body. In the present embodiment, since the rubber mounts 180 are interposed between the suspension frame 150 and the vehicle body 170, the vibration and the noise caused by the trailer 200 are hardly transmitted to a vehicle cabin side. Further, it is not necessary to secure an attachment space for the hitch member 190 on a rear end side of the vehicle body 170, so that the degree of freedom in designing the rear end side of the vehicle body 170 increases. Also, the hitch member 190 can be simply and easily attached to the vehicle 100 having a small amount of rearward overhang from the axle 145 on the rear side.

The suspension frame 150 under the floor panel 171 is exposed outside the vehicle. Therefore, when attaching the hitch member 190 to the vehicle, unlike the related art in which the hitch member is attached to a rear end of a frame of the vehicle body, it is not necessary to remove a bumper, and the workability of attaching the hitch member 190 can be improved. In addition, since the hitch member 190 is attached to the vehicle body 170 via the suspension frame 150 having a relatively high rigidity, deformation, cracking, and the like are less likely to occur in the vehicle body as compared with the related art in which the hitch member is attached to the rear end of the frame of the vehicle body. In addition, it is possible to reduce the weight and cost due to the simplified component configuration. Since the suspension frame 150 has the relatively high rigidity, the suspension frame 150 is suitable for attaching the hitch member.

In the above-described embodiment, the interposed member is interposed between the vehicle body 170 and components of both the rear suspension and the rear differential 140. However, the interposed member may be interposed between the vehicle body 170 and the components of one of the rear suspension and the rear differential 140. For example, the interposed member may be a bracket that supports the components of the rear differential 140 but does not support the components of the suspension. Since the bracket of the rear differential 140 has a relatively high rigidity, the bracket is suitable for attaching the hitch member. The under-floor component may be a component other than the components of the rear suspension and the rear differential, and may be, for example, a component of a motor unit that drives the rear wheels. Since a bracket of the motor unit has a relatively high rigidity, the bracket is suitable for attaching the hitch member.

Although the embodiment of the disclosure has been described above, the embodiment described above does not limit the disclosure according to the claims. It is also noted that not all the combinations of the features described in the embodiment are necessary for solving the problem of the disclosure.

According to the disclosure, the hitch member can be simply and easily attached even in the vehicle having a small amount of overhang from the axle on the rear side, and deformation, cracking, and the like are less likely to occur in the vehicle body.

The invention claimed is:

1. A rear structure of a vehicle, the rear structure comprising:
   an interposed member disposed at a center area in a vehicle width direction of the vehicle under a floor panel of a vehicle body of the vehicle, and interposed between at least one under-floor component of the vehicle and the vehicle body; and
   an attachment part for a hitch member for a trailer, the attachment part being disposed at a rear end of the interposed member and at a center area of the interposed member in the vehicle width direction,
   wherein the attachment part extends parallel to a bottom surface of the interposed member and a top surface of the interposed member.

2. The vehicle rear structure according to claim 1, wherein the at least one under-floor component comprises a component of a rear suspension.

3. The vehicle rear structure according to claim 1, wherein the at least one under-floor component comprises a component of a rear differential.

4. The vehicle rear structure according to claim 2, wherein the at least one under-floor component comprises multiple under-floor components, and
   wherein the under-floor components comprise a component of a rear differential.

5. The vehicle rear structure according to claim 1, wherein the at least one under-floor component comprises a component of a motor unit.

6. The vehicle rear structure according to claim 2, wherein the at least one under-floor component comprises multiple under-floor components, and
   wherein the under-floor components comprise a component of a motor unit.

7. The vehicle rear structure according to claim 3, wherein the at least one under-floor component comprises multiple under-floor components, and
   wherein the under-floor components comprise a component of a motor unit.

8. The vehicle rear structure according to claim 4, wherein the under-floor components comprise a component of a motor unit.

9. A trailer coupling structure of a vehicle, the trailer coupling structure comprising:
   the rear structure according to claim 1; and
   a hitch member comprising a member main body horizontally extending in a front-rear direction of the vehicle,
   wherein a front end of the hitch member is attached to the attachment part of the interposed member, and
   wherein a rear end of the hitch member is coupled to a ball mount comprising a hitch ball.

10. A trailer coupling structure of a vehicle, the trailer coupling structure comprising:
    the rear structure according to claim 2; and
    a hitch member comprising a member main body horizontally extending in a front-rear direction of the vehicle,
    wherein a front end of the hitch member is attached to the attachment part of the interposed member, and
    wherein a rear end of the hitch member is coupled to a ball mount comprising a hitch ball.

11. A trailer coupling structure of a vehicle, the trailer coupling structure comprising:
    the rear structure according to claim 3; and
    a hitch member comprising a member main body horizontally extending in a front-rear direction of the vehicle,
    wherein a front end of the hitch member is attached to the attachment part of the interposed member, and
    wherein a rear end of the hitch member is coupled to a ball mount comprising a hitch ball.

12. A trailer coupling structure of a vehicle, the trailer coupling structure comprising:
    the rear structure according to claim 4; and
    a hitch member comprising a member main body horizontally extending in a front-rear direction of the vehicle,
    wherein a front end of the hitch member is attached to the attachment part of the interposed member, and
    wherein a rear end of the hitch member is coupled to a ball mount comprising a hitch ball.

13. A trailer coupling structure of a vehicle, the trailer coupling structure comprising:
    the rear structure according to claim 5; and
    a hitch member comprising a member main body horizontally extending in a front-rear direction of the vehicle,
    wherein a front end of the hitch member is attached to the attachment part of the interposed member, and
    wherein a rear end of the hitch member is coupled to a ball mount comprising a hitch ball.

14. A trailer coupling structure of a vehicle, the trailer coupling structure comprising:
    the rear structure according to claim 6; and
    a hitch member comprising a member main body horizontally extending in a front-rear direction of the vehicle,
    wherein a front end of the hitch member is attached to the attachment part of the interposed member, and
    wherein a rear end of the hitch member is coupled to a ball mount comprising a hitch ball.

15. A trailer coupling structure of a vehicle, the trailer coupling structure comprising:
    the rear structure according to claim 7; and
    a hitch member comprising a member main body horizontally extending in a front-rear direction of the vehicle,
    wherein a front end of the hitch member is attached to the attachment part of the interposed member, and
    wherein a rear end of the hitch member is coupled to a ball mount comprising a hitch ball.

16. A trailer coupling structure of a vehicle, the trailer coupling structure comprising:
    the rear structure according to claim 8; and
    a hitch member comprising a member main body horizontally extending in a front-rear direction of the vehicle, wherein a front end of the hitch member is attached to the attachment part of the interposed member, and wherein a rear end of the hitch member is coupled to a ball mount comprising a hitch ball.

17. The vehicle rear structure according to claim 1, wherein the attachment part is attached to the interposed member by bolts.

18. The vehicle rear structure according to claim 2, further comprising a rubber mount that fixes the interposed member to the vehicle body.

19. A rear structure of a vehicle, the rear structure comprising:

an interposed member disposed at a center area in a vehicle width direction of the vehicle under a floor panel of a vehicle body of the vehicle, and interposed between at least one under-floor component of the vehicle and the vehicle body; and an attachment part for a hitch member for a trailer, the attachment part being disposed at a rear end of the interposed member and at a center area of the interposed member in the vehicle width direction, wherein the at least one under-floor component comprises a component of a rear differential.

20. A rear structure of a vehicle, the rear structure comprising:

an interposed member disposed at a center area in a vehicle width direction of the vehicle under a floor panel of a vehicle body of the vehicle, and interposed between at least one under-floor component of the vehicle and the vehicle body; and an attachment part for a hitch member for a trailer, the attachment part being disposed at a rear end of the interposed member and at a center area of the interposed member in the vehicle width direction, wherein the at least one under-floor component comprises a component of a rear suspension, wherein the at least one under-floor component comprises multiple under-floor components, and wherein the under-floor components comprise a component of a rear differential.

* * * * *